Feb. 24, 1948.  W. M. HEYNES  2,436,573
SUSPENSION UNIT, PARTICULARLY FOR MOTOR VEHICLES
Filed Oct. 11, 1944
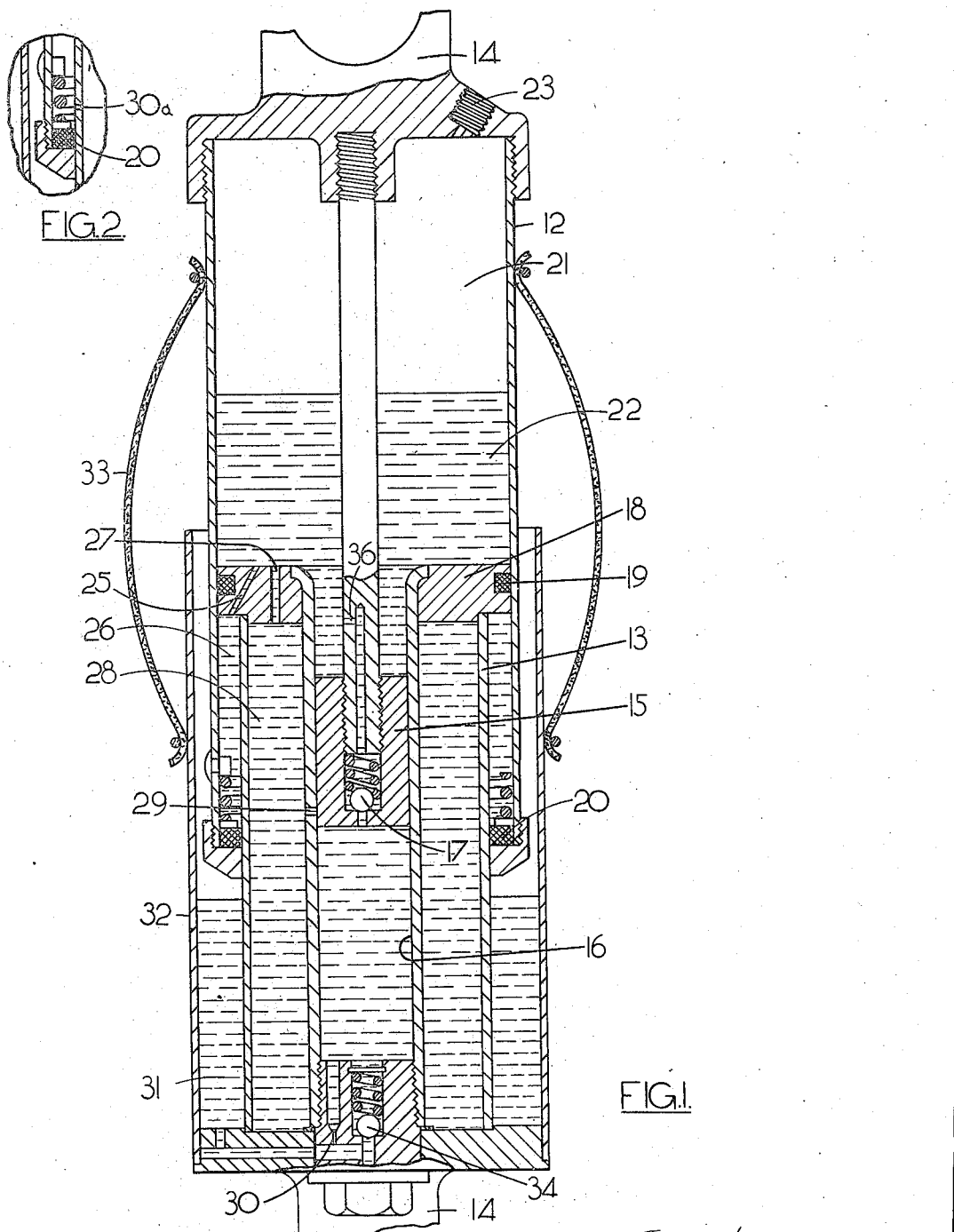
Inventor
William M. Heynes
by Mawhinney & Mawhinney
Attorneys Patented Feb. 24, 1948

2,436,573

UNITED STATES PATENT OFFICE 2,436,573

SUSPENSION UNIT, PARTICULARLY FOR MOTOR VEHICLES

William Munger Heynes, Coventry, England

Application October 11, 1944, Serial No. 558,201
In Great Britain April 14, 1944

2 Claims. (Cl. 267—64)

This invention relates to a suspension unit of the telescopic type, in which a reduction in size due to an increased load is resisted by a gaseous fluid compressed above atmospheric pressure, and although not limited in this respect it is particularly applicable to a suspension unit for use in interconnecting the hub assembly of a roadwheel or a through axle with the chassis-frame or body of a motor-vehicle.

My main object is to provide improvements in connection with this type of unit, and, in particular, to provide means whereby it will function satisfactorily in the case of widely-different static loads.

A more particular object is to provide, in combination with the unit, means tending to maintain the unit at a predetermined size independently of changes in the static load. Conveniently, the said means includes a liquid pump operated by the reciprocable motion of the unit when in use, the liquid (supplied from a reservoir) acting upon the gaseous fluid and being able to leak back to the reservoir in predetermined conditions.

For an understanding of these and other objects and advantages of the invention I will now describe one specific construction with the aid of the accompanying drawing.

Figure 1 of the drawing is a sectional elevation of one arrangement according to the invention, and Figure 2 is a fragmentary view showing a modification.

In the construction shown, the unit is a so-called telescopic strut the upper portion 12 of which is formed as an inverted cylinder reciprocally engaged internally with a hollow, annular piston 13 which constitutes the lower portion. Each of these portions is formed with a lug 14 for attachment purposes. Fast and coaxial with the upper portion is a plunger 15 working in the bore 16 of the annular piston and constituting the plunger of a reciprocating pump, the plunger having an outlet valve 17, for example, in the form of a spring-loaded ball valve, whereby liquid can be pumped from the bore 16 of the annular piston, i. e., the pump chamber, to the liquid above the piston head 18. The piston head 18 provides at its periphery a seal 19 with the interior wall of the inverted cylinder 12, and the lower extremity of the latter provides a seal 20 with the exterior surface of the piston 13. The upper portion of the upper chamber contains the gaseous fluid at 21, being bounded on its lower side by liquid 22, and any convenient provision may be made for supplying gaseous fluid under pressure when "topping up" is necessary, as by means of the opening 23.

A relatively-small bleed passage 25 through the piston head 18 interconnects the upper chamber with the annular chamber 26 bounded by the piston head 18, the lower portion of the inverted cylinder 12 and the upper portion of the piston 13. A second bleed hole 27 interconnects the hollow interior 28 of the piston 13 with the upper chamber. A port 29 is provided to interconnect the hollow interior 28 of the piston and the pump chamber 16 in certain positions of the unit, this port being controlled by the pump plunger 15. A third bleed hole 30 is arranged (Figure 1) to interconnect the pump chamber 16 and a reservoir 31 for liquid, which conveniently takes the form of a cup-shaped portion 32 fast with the piston and extending upwardly with clearance from the inverted cylinder for a sufficient height, its upper edge being closed by means of a flexible gaiter 33 or the like. The pump chamber 16 also connects with the reservoir by means of an inlet valve 34, for example, a spring-pressed ball valve.

In the case of motor-vehicle suspension I will assume, for example, that the unit is designed to be approximately half expanded (i. e., as illustrated) for a normal static load. In these conditions, when loaded in this way, the port 29 may be just covered, as shown, by the plunger 15 of the pump. If now the vehicle be driven the reciprocatory movements of the unit, which occur also in the pump, will serve for withdrawing liquid from the reservoir 31 and bringing it into operative use in the interior of the unit, delivering it along the passage 36, with the result that the unit will extend until the port 29 is uncovered by the pump plunger 15, after which the pump is ineffective. All shock loads which are momentarily applied are resisted by the gaseous fluid 21 at the upper end of the inverted cylinder 12, and damping is provided by liquid being forced through the bleed hole 25 from the lower end of the upper chamber to the annular chamber 26, and conversely, when the applied load is momentarily reduced. The slight leakage taking place through the third bleed passage 30 will tend to reduce the length of the strut until the port 29 is again covered, when the cycle above described will again take place. Actually, of course, in practice these various functions are occurring substantially simultaneously.

If now the suspension unit be overloaded—for example, by the vehicle accommodating extra passengers—the length of the strut will be reduced, the gaseous fluid 21 becoming more highly compressed. As soon as the vehicle is again put into motion, however, the reciprocal operation of the pump will draw in fresh liquid from the reservoir 31 as before and put it into operative use until such time as the strut is again extended to its normal length, independently of whether the static load has been doubled, or even trebled; and, as before, the normal length of the strut will tend to be maintained under this higher static load. As soon, however, as the excess static load is removed the strut will extend under the action of the gaseous fluid 21 and the port 29 will be uncovered, so that the pump will be ineffective, if the vehicle is still travelling. Meanwhile the pump chamber 16 will be leaking through the bleed passage 30 to the reservoir 31 until once more the strut attains its normal length, when the port 29 will be cut off.

In the construction particularly described above it is assumed that the upper chamber has in it liquid acting upon the gaseous fluid. The latter may, if desired, be totally enclosed therefrom, as described in the specification of my copending application Serial No. 547,779, filed August 2, 1944, now abandoned.

The liquid level need not, however, be as high as this. The liquid may, for example, not completely fill the hollow interior 28 of the annular piston, in which case provision is made for the upper end of the interior to communicate with the delivery from the pump, and the annular chamber 26 may be entirely free of liquid, damping being provided in that case by the passage of the gaseous fluid through the bleed passages 25, 27 which will be made correspondingly smaller than when liquid is used for the damping.

It will be understood that the unit is self-recuperating as regards leakage of the liquid.

Instead of the continuously-open bleed hole 30 between the pump chamber 16 and the reservoir 31 use may be made, as shown by Figure 2, of a bleed hole 30a through the outer wall of the annular piston, this bleed hole being controlled by the seal 20 so as to place the interior 28 of the piston in communication with the reservoir 31 only when the strut is sufficiently extended, the bleed port 30a being positioned where required dependently upon what is to be the normal length of the strut.

What I claim as my invention and desire to secure by Letters Patent of the United States is:

1. A suspension unit of the telescopic type, in which a reduction in size due to an increased load is resisted by a gaseous fluid compressed above atmospheric pressure, including a cylinder the main interior space of which contains the compressed gaseous fluid, a hollow annular piston having a head operable in and bounding the main interior space of the cylinder to leave an annular chamber, between said hollow annular piston and said cylinder on the side of said head which is remote from said main interior space, which increases in size as the main interior space of the cylinder diminishes, and conversely, these two spaces being interconnected by a bleed hole, the bore of the annular piston constituting a pump chamber, a plunger fast with the cylinder operating in the pump chamber, the piston having a port, between the pump chamber and the hollow annular interior of the piston, which is controlled by the plunger dependently upon the extension of the unit, damping means placing the hollow annular interior of the piston in communication with the main interior space of the cylinder, an inlet valve for the pump chamber, a reservoir, for liquid, communicating with the pump chamber both by a bleed hole and by the inlet valve, and an outlet valve in the plunger through which liquid can be delivered by the pump to the main interior space of the cylinder.

2. A two-part strut comprising an inverted cylinder having an outer compressed gas space and an inner liquid space, an annular piston having inner and outer walls and defining on its interior a pump chamber and having a head slidably mounted in said cylinder, the inner wall of said piston having a port therein intermediate its ends, a pump plunger fast with the cylinder and fitted to reciprocate in said annular piston and positioned to open and close said port, said plunger having a passage connecting the pump chamber with said cylinder, a spring-loaded valve controlling said port and biased to open on inward movement of the plunger, a cup-shaped portion carried by the outer portion of said annular piston and defining a liquid reservoir, said cup-shaped portion having a passage between said reservoir and pump chamber, a spring-loaded valve controlling said last named passage openable on outward movement of said plunger, the outer wall of said annular piston separating said reservoir from an inner tubular liquid space about said annular piston, said outer wall spaced from the cylinder and defining an outer liquid space therebetween, said piston head having bleed holes leading from said cylinder to the inner and outer liquid spaces.

WILLIAM MUNGER HEYNES.

REFERENCES CITED

The following references are of record in the file of this patent:

UNITED STATES PATENTS

| Number | Name | Date |
|---|---|---|
| 1,113,370 | Ostendorf | Oct. 13, 1914 |
| 1,198,643 | Liebau | Sept. 19, 1916 |
| 1,340,233 | Liebau | May 18, 1920 |
| 1,487,597 | Poindexter | Mar. 18, 1924 |
| 1,503,274 | McElroy | July 29, 1924 |